C. ROMM.
BUTTON SETTING MACHINE.
APPLICATION FILED APR. 17, 1909.

954,821.

Patented Apr. 12, 1910.
5 SHEETS—SHEET 5.

Witnesses

Inventor
Charles Romm
By C. A. Snow & Co.
Attorneys

UNITED STATES PATENT OFFICE.

CHARLES ROMM, OF PITTSBURG, PENNSYLVANIA, ASSIGNOR OF ONE-HALF TO JOSEPH KLEIN, OF PITTSBURG, PENNSYLVANIA.

BUTTON-SETTING MACHINE.

954,821.     Specification of Letters Patent.     Patented Apr. 12, 1910.

Application filed April 17, 1909. Serial No. 490,502.

*To all whom it may concern:*

Be it known that I, CHARLES ROMM, a subject of the Czar of Russia, residing at Pittsburg, in the county of Allegheny and State of Pennsylvania, have invented a new and useful Button-Setting Machine, of which the following is a specification.

This invention has reference to improvements in button setting machines and its object is to provide a machine wherein buttons are automatically fed to an anvil in position to receive a rivet whereby the button is secured to cloth interposed between the button and holding rivet.

It is customary in machines of this kind to provide an anvil upon which is placed a button head or blank and then feed a rivet in a position to pass through the cloth to which the button is to be attached and through an eye formed in the button; the portion of the rivet extending through the eye of the button is then upset or headed to unite the rivet to the button with the cloth intervening thus securing the button firmly to the cloth without danger of separation. The button blanks, or as may be termed, the buttons are placed upon the anvil by hand while the rivets are fed automatically to place and are forced through the cloth and through the eye of the button and are then upset or riveted by mechanism controlled by an operator. The necessary handling of the buttons or button blanks one at a time by hand greatly retards the action of the mechanism. The present invention hastens and facilitates the operation of attaching buttons of the kind mentioned by not only feeding the rivets in the customary automatic manner but by providing a mechanism wherewith the buttons or button blanks are also automatically fed into position one at a time upon the anvil in proper related order to the feeding of the rivet so that the several operations of feeding and attaching the buttons and rivets shall be sequential and automatic.

The invention will be best understood from a consideration of the following detail description taken in connection with the accompanying drawings, forming a part of this specification, in which drawings.

In the drawings there is shown a post or pedestal 1 which may, as is customary in structures of this character, be made hollow for the sake of lightness without sacrificing the strength needed and on top of this post or pedestal there is secured an overhanging arm 2 carrying a rivet feeding mechanism 3 which may be of any known construction suitable for the purpose, such for instance as the feed mechanism shown in the United States patent to W. P. Bartel, No. 650,578, granted May 29, 1900.

The rivet feeding mechanism in itself forms no part of the present invention and need therefore not be particularly described nor is it material that the particular rivet feeding mechanism set forth in the said Letters Patent be used in connection with the present invention and therefore the showing of this mechanism may be taken as typical only.

The rivet mechanism is provided with a reservoir 4 and a reciprocatory rivet carrier 5 to which latter reference will be had hereinafter.

Secured to the post or standard 1 are spaced brackets 6—7 one above the other in a vertical plane and each provided at the outer end with an eye 8. Secured in the two eyes 8 is a tube 9 which may extend above the upper eye 8 and there carry a frusto-conical sleeve 10 or this end of the tube may be otherwise finished as desired.

The tube 9 is fast in the eyes 8 of the two brackets 6 and 7 and constitutes a guide for a rod 11. Between the two brackets 6 and 7 the tube 9 is longitudinally slotted at diametrically opposite points as indicated at 12.

Extending through the rod 11 and out through the slot 12 in the sleeve 9 is a pin 13 receiving at each end one end of a link 14 held to the corresponding end of the rod by a nut 15, or the pin 13 may be in the form of a bolt with the head at one end and receive a nut at the other end.

The links 14 are connected at the ends remote from the ends connected to the bolt or pin 13 to the two legs of a yoke 16 straddling the tube 9 and formed on one end of a lever 17 pivoted on a strap 18 extending between and secured at the ends to the two brackets 6 and 7 adjacent to the ends of the brackets having the eyes 8. The end of the lever 17 remote from that formed into the yoke 16 is connected by a link 19 to the treadle end 20 of a treadle lever 21 pivotally supported in the post or standard 1. The lever 21 extends through the post or standard 1 and beyond the same and the end remote from the treadle end 20 is connected by a link 22 to an operating lever 23 actuating the several parts of the rivet supplying mechanism 3.

The connection between the lever 21 and the lever 17 is such that when the lever 21 is depressed by the pressure of the foot of the operator upon the treadle end of such lever, the lever 17 will be rocked in a direction to elevate the rod 11. When pressure is relieved from the pressure end of the lever 21 then a spring 24, fast at one end to the lever 21 and at the other to the post or pedestal 1 causes the elevation of the treadle end of the lever 21 and the depression of the rod 11.

The upper end of the rod 11 is reduced in diameter to form an axial stem 25 and near the free end this stem is traversed by a longitudinal slot 26. Applied to the free end of the stem 25 is a sleeve 27 capable of longitudinal movement along the stem but limited in such movement by a cross pin 28 traversing the slot 26, and secured at the ends in the walls of the sleeve 27. This sleeve is closed at the outer end and there formed into a screw nipple 29 upon which is screwed an anvil 30 having an axial boss 31 countersunk at the center as shown at 32. The anvil 30 is shaped to receive a button or button blank 33 which in the particular instance shown in the drawings is adapted to rest on the anvil with the boss 31 entering the hollow stem of the button.

The anvil 30 is capable of longitudinal movement with reference to the stem 25 because of the slot 26 and the sleeve 27 carrying the anvil is held with the pin 28 normally at the outer end of the slot 26 by a spring 34 encircling the stem 25 and abutting at the ends against the shoulder formed at the junction of the stem with the rod 11 and against the corresponding end of the sleeve 27.

Surrounding the tube 9 below the eye 8 of the bracket 6 is a sleeve 35 formed at the upper end into an annular head 36 under-ridden by a collar 37 carried by an arm 38 fast on the bar 18.

The sleeve 35 has formed through its walls a helical slot 39 extending nearly the length of the sleeve and through this slot there projects a pin 40 carried by the rod 11 and projecting through a longitudinal slot 41 formed at this point through the tube 9.

The collar 37 upholds the sleeve 35 by under-riding the head 36, and to reduce friction at this point the sleeve 35 rotating for a purpose which will presently appear, anti-friction balls 42 are introduced between the opposed faces of the collar and head 36, suitable grooves for the reception of the balls being formed in said opposing faces.

Formed in the upper face of the head 36 is a radial recess 43 opening into the periphery of the head 36 and having its bottom wall 44 slanting downward toward the tube 9, the tube at this point being provided with a through passage 45. Normally the recess 43 in the head 36 is out of alinement with the passage 45 but the sleeve 35 may be turned on its longitudinal axis until the recess 43 and the passage 45 aline.

Encircling the head 36 is a collar 46 having from one side parallel wings 47 extending to and made fast on the bar 18 before mentioned. This collar 46 has a recess 48 matching the recess 43 in the head 36 when the latter is in normal position, and prevents escape of buttons from the recess 43 through the action of centrifugal force when the head is rotated. Applied to the upper face of the head 36 between the same and the under face of the eye 8 of the bracket 6 is a plate 49 in the form of an annulus so as to conform to the shape of the head 36. This plate is formed on one face with two parallel wings 50 having their lower edges slanting in conformity with the slant of the surface 45 of the recess 43 and these wings are adapted to be housed in said recess with the slanting lower edges 51 parallel with but separated a slight distance from the lower or bottom wall 45 of the recess 43. The collar 46 forms a support for the lower end of an inclined button guide 52 formed of a flat member 53 and two spaced parallel top members 54 separated from the bottom member at the edges by spacing strips 55 so that a button 33 will slide through the button guide with the body of the button confined between the strips 54 and the bottom portion 53 while the neck of the button will travel along the space between the adjoining edges of the members 54. It will be observed that the plate 49 is also recessed between the wings 50 as indicated at 56.

Secured to the post or standard 1 is an upright bracket 57 having an angle extension 58 at the upper end and this angle extension carries a plate 59 having an annular peripheral rib 60 with an off-set portion 61 at one side, the off-set portion and the annular rib being continued along a tangential lip 62 formed on the plate 59, in parallel relation to form the two side walls 63 of a guideway leading into the passageway of the button guide 52, the upper end of this button guide being made fast to a projecting member 64 leading from the lip 62.

Figure 1:
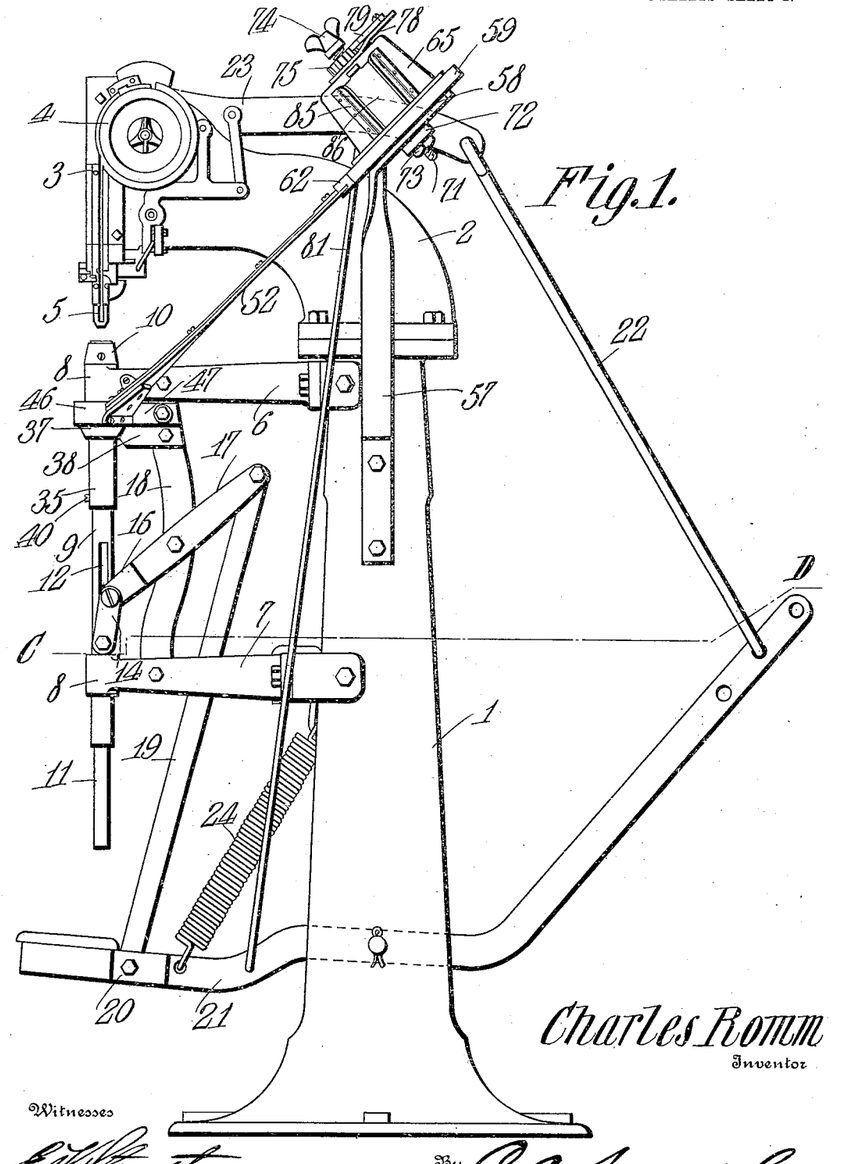
Figure 1 is a side elevation of the machine in normal position.
Figures 2, 3:
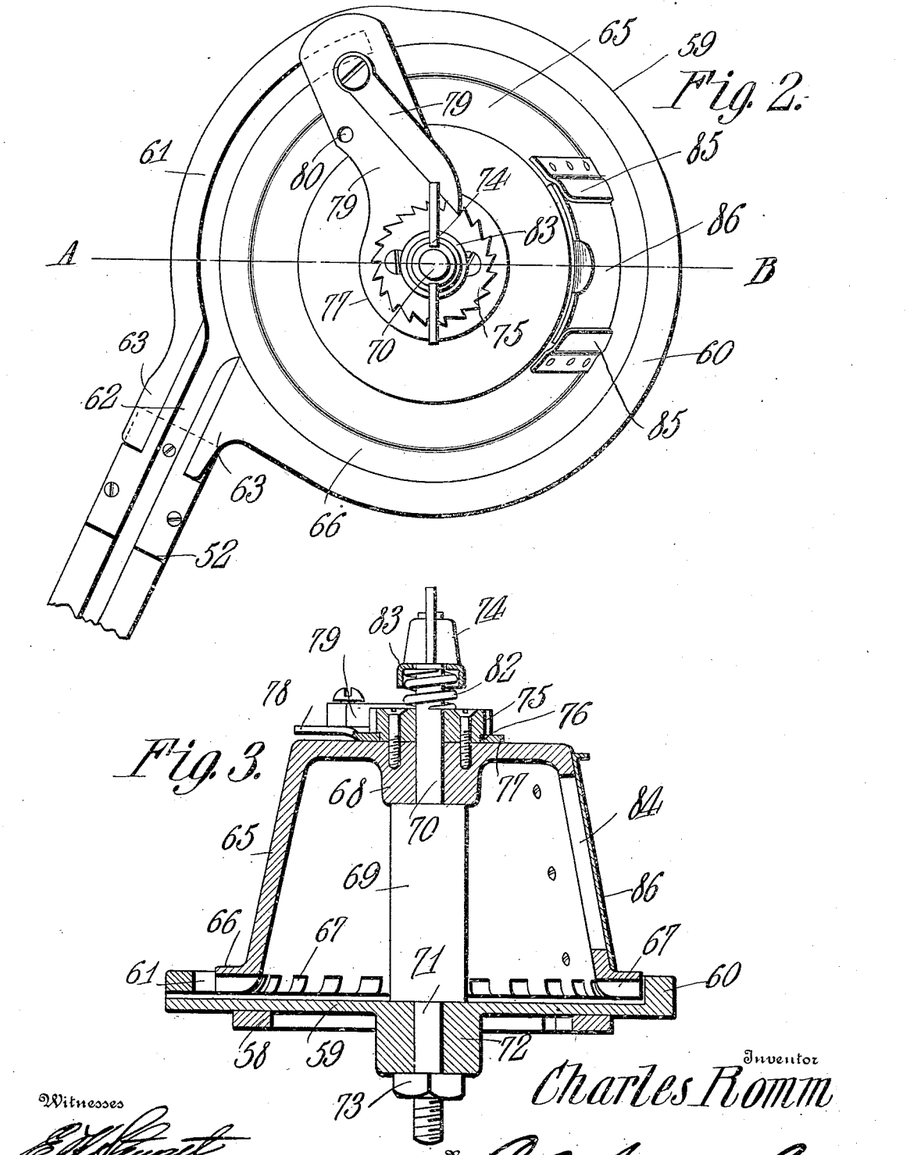
Fig. 2 is a top plan view of the button magazine shown on a larger scale than Fig. 1.
Fig. 3 is a diametric section of the button magazine on the line A—B of Fig. 2.
Figure 4:
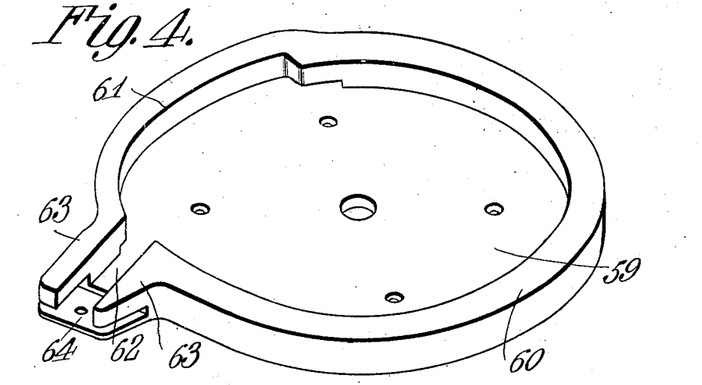
Fig. 4 is a perspective view of the basic plate of the button magazine.

The plate 59 is inclined at an angle to both the vertical and horizontal, this angle being shown in the drawings as approximately 45°. The plate 59 forms the basic member of a reservoir which latter is in the form of a cup of frusto-conical shape with the flaring ends in close relation to the upper surface of the plate 59. This reservoir body is indicated at 65 and is best shown in Figs. 2 and 3. The base or flaring end of the reservoir 65 is formed with a radial flange 66 through which there is formed a circumferential series of radial passages 67.

The outer end of the reservoir is closed and this outer end carries an upwardly projecting central boss 68 axially perforated and resting on the outer end of a stem 69 formed at each end with a reduced portion 70 and 71 respectively, the portion 71 extending through a boss 72 formed on the outer surface of the plate 59 and secured thereto by a nut 73.

The reduced portion 70 of the stem 69 extends through an axial passage in the boss 68 and for a distance beyond the outer face of the closed end of the reservoir 65 where this stem is threaded for the reception of a wing nut 74.

Surrounding the stem extension 70 and made fast to the outer face of the reservoir 65 is a ratchet wheel 75 provided with an annular rabbet 76 on the face adjacent to the closed end of the reservoir and in this rabbet there is seated the ring shaped end 77 of an arm 78 carrying a pawl 79. This arm is provided with a perforation 80 for the reception of one end of a rod 81, the other end of which is attached to the lever 21 on the treadle end thereof. Surrounding the stem extension 70 between the wing nut 74 and the ratchet wheel 75 is a spring 82 separated from the wing nut by a cup washer 83. Because of the position of the arm 78 and of the reservoir the pawl 79 will engage the ratchet wheel 75 and be held thereto by gravity, but of course if desirable a spring may be added to insure the proper engagement of the pawl with the ratchet wheel.

The reservoir is cut away at one point as indicated at 84 for the introduction of a supply of buttons into the reservoir and this opening is flanked by guides 85 for the reception of a sliding gate or door 86. The overhanging portions of the guides 85 may be made slightly elastic so as to bind the door 86 in place without the necessity of adding any special fastening means.

The relation of the flange 66 and the end of the reservoir adjacent to the flange 59 to the annular rib 60 is such that this rib will close the outer ends of the openings 67 except at the off-set portion 61 where buttons confined within the reservoir may escape through these passages 67 into the off-set portion 61 and from there gravitate into the upper open end of the guide-way 52 from whence the buttons will pass to the opening 48 in the collar 46.

Figure 7:
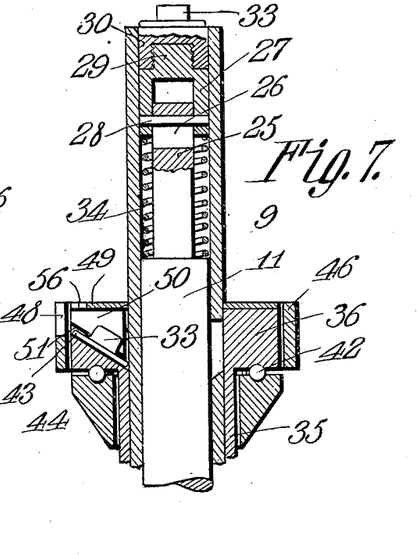
Fig. 7 is a similar view of the upper end of the anvil guide with the anvil projecting.
Figure 8:
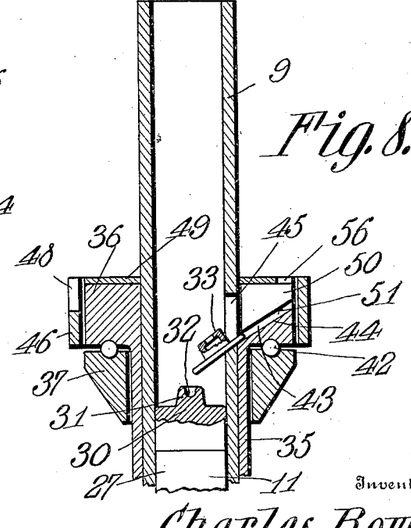
Fig. 8 is a view similar to that of Fig. 7 with the anvil in the retracted position.
Figures 9, 10:
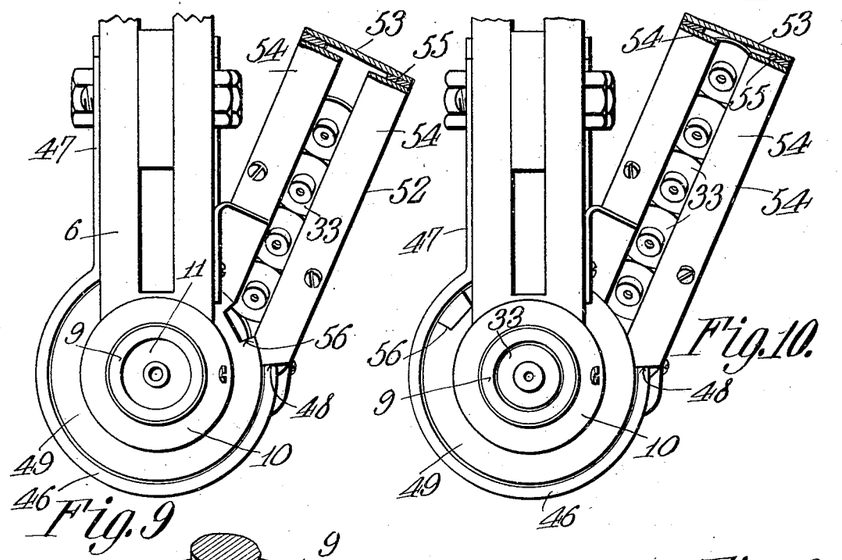
Fig. 9 is a top plan view of the anvil and anvil guide and carrier for the same and also the adjacent end of the button guide showing the parts in one operative position.
Fig. 10 is a similar view showing the same parts in another operative position.
Figure 11:
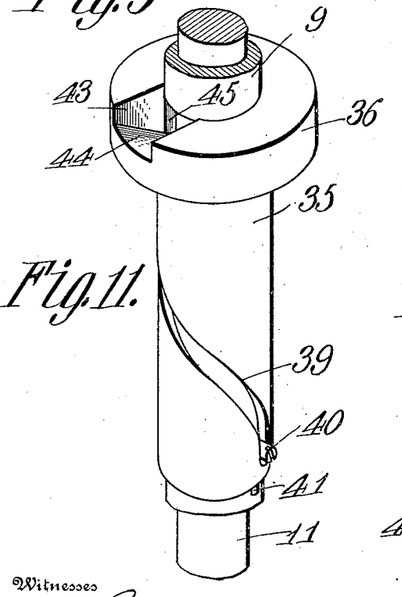
Fig. 11 is a perspective view of a portion of the anvil carrier and guide and the button directing mechanism.
Figures 12, 13:
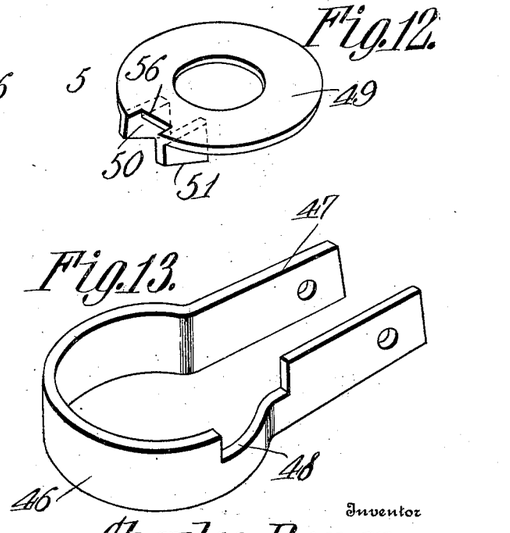
Fig. 12 is a detail perspective view of a cap plate used in connection with the structure shown in Fig. 11.
Fig. 13 is a detail perspective view of a supporting strap for the structure shown in Fig. 11.

In the normal or inactive position of the parts the treadle end 20 of the lever 21 is in the elevated position where it is maintained by the retractive force of the spring 24. The rod 11 is therefore in the depressed condition with the anvil 30 below the opening 45 through the tube 9, and the sleeve 35 is in such position that the recess 43 in the head 36 is in line with the passage 45. Suppose that the recess 43 should contain a button 33 then when the parts are in the position last named, this position being shown in Fig. 8, the button 33 will gravitate off the inclined bottom 44 of the recess 43 and will drop on the anvil 30 in position to have the boss or stud 31 enter the neck of the button. If now pressure be applied to the treadle end of the lever 21 and the pressure be sufficient, the spring 24 is extended and the lever 21 is turned about its pivot in a direction to cause a movement of the lever 17 in a direction to elevate the rod 11. The movement is sufficiently extensive to cause the projecting of the anvil 30 above the upper end of the pipe 9 to the position shown in Fig. 7, and during this movement the pin 40 is carried along the slot 41 in the pipe 9 and acting on the helical slot 39 in the sleeve 35 will cause a rotative movement of the latter carrying the recess 43 from coincidence with the passage 45 into coincidence with the passage 48 through the collar 47 while the recess 56 in the plate 49 between the wings 50 is also brought into coincidence with the passage 48. The said passage 48 being in line with the discharge end of the button conduit 52 the button 33 will gravitate into the recess 43 until arrested by engagement with the outer wall of the tube 9, the recess 43 being sufficiently long to admit the button but to prevent the entrance of the next succeeding button. When pressure on the treadle is released then the spring 24 returns the lever 21 to its normal position and this causes a lowering movement of the rod 11 thus returning the sleeve 35 to its normal position with the recess 43 in alinement with the passage 48 and a button lodged in the recess 43 from the button conduit 52 in the manner already described is carried around the tube 9 until it reaches the passage 48 when it escapes through this passage and drops onto the anvil 30. The space between the under edge of each wing 51 and the bottom 44 of the recess 43 is just sufficient to easily hold the head of a button with the neck or shank uppermost and it is in this position that the button is originally allowed to move into the recess 43. When the lever 21 is depressed by pressure upon the treadle end then movement is transmitted to the arm 78 through the rod 81 and this arm is rotated about the axis of the ratchet wheel 75 with the pawl 79 riding idly over the ratchet teeth. When however pressure on the treadle is released then the spring 24 on returning the lever to its original position acts through the rod 81 and the arm 78 to return the arm 78 to its normal position and because of the engagement of the pawl 79 with the teeth of the ratchet wheel 75 during this movement of the arm 78 the ratchet wheel is rotated and being fast to the reservoir 65 the latter participates in this movement.

Because of the inclined position of the reservoir 65 the button will tend to gravitate toward one side thereof and the heads of the buttons will engage between the edge of the flange 66 and the bottom plate 59 while the shanks of the buttons will find lodgment in slots 67. The rotary motion of the reservoir not only causes the buttons to find engagement in the slots 67 but on carrying these buttons around they ultimately will fall out of the slots when the off-set portion 61 is reached and then will readily gravitate into the button guide 52. Should any of the buttons not find ready escape through the slots 67 they are carried up around the off-set 61 until the slots 67 incline toward the interior of the reservoir when the buttons will gravitate into the interior of the reservoir. The rotative movement of the reservoir at each depression of the pedal lever 21 is sufficient to present several of the slots to the escape portion 61 of the plate 59 so that there is always an ample supply of buttons tending to move into the button guide 52.

While the operations described have been taking place the rivet mechanism 3 has been operating in timed relation to the presentation of a button 33 by the anvil at the upper end of the tube 9. The sequence of operation is such that when a button 33 is presented at the upper end of the tube 9 a rivet is presented at the end of the plunger 5, and the cloth overlying the button 33 is pierced by the downward movement of the plunger 5 acting on the rivet to force it through the cloth and through the usual eye of the button then the point of the rivet will enter the countersunk portion 32 of the anvil and be upset or headed within the neck or shank of the button thus firmly uniting the button and rivet together with the cloth intervening. When the anvil is again lowered to receive another button the plunger 5 is retracted and a rivet is permitted to drop into proper relation thereto all as described in the aforesaid Letters Patent ready to present it to the cloth and enter another button elevated by the next movement of the anvil into position to receive the next succeeding rivet. In this manner the buttons may be riveted upon cloth as rapidly as an operator may depress and release the treadle lever and advance the cloth to new positions to receive the buttons.

The machine is not confined in its operations to the particular type of buttons shown in the drawings since by merely putting the rivet supplying means out of commission buttons of known type having shanks designed to be upset after the manner of ordinary eyelets may be placed in the button reservoir and fed the same as the buttons shown in the drawings when the plunger 5 will merely act on these buttons to cause the upsetting of the shank and the clamping of the buttons to the cloth.

Figures 5, 14, 15, 16, 17, 18:
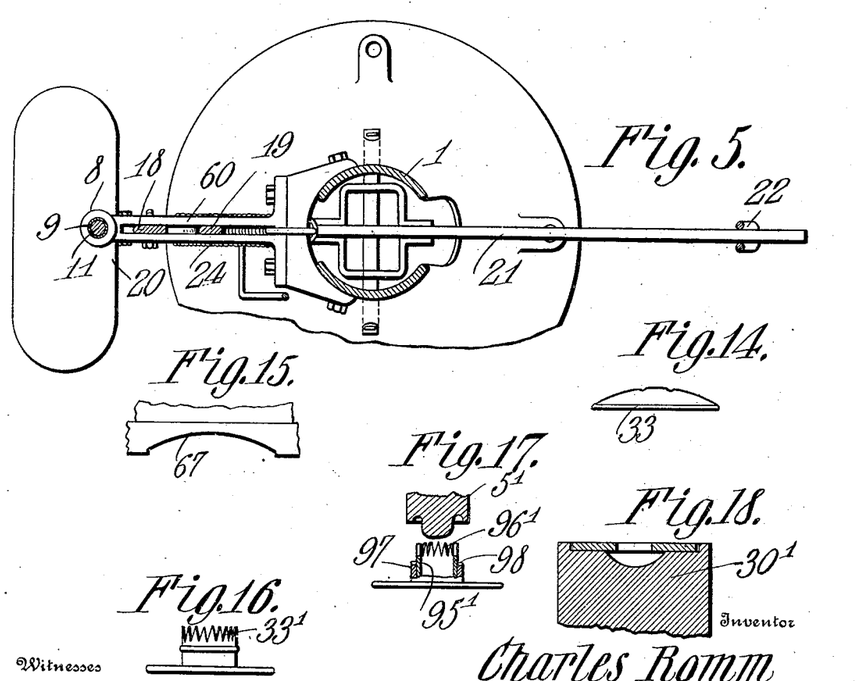
Fig. 5 is a section on the line C—D of Fig. 1.
Fig. 14 is a view of a known type of button.
Fig. 15 is a view illustrating a form of passageway through the button magazine for a button such as shown in Fig. 14.
Fig. 16 is a view of another form of button.
Fig. 17 is a view of still another form of button and the upsetting or clenching tool therefor.
Fig. 18 is a section of an anvil especially adapted for washers.
Figure 6:
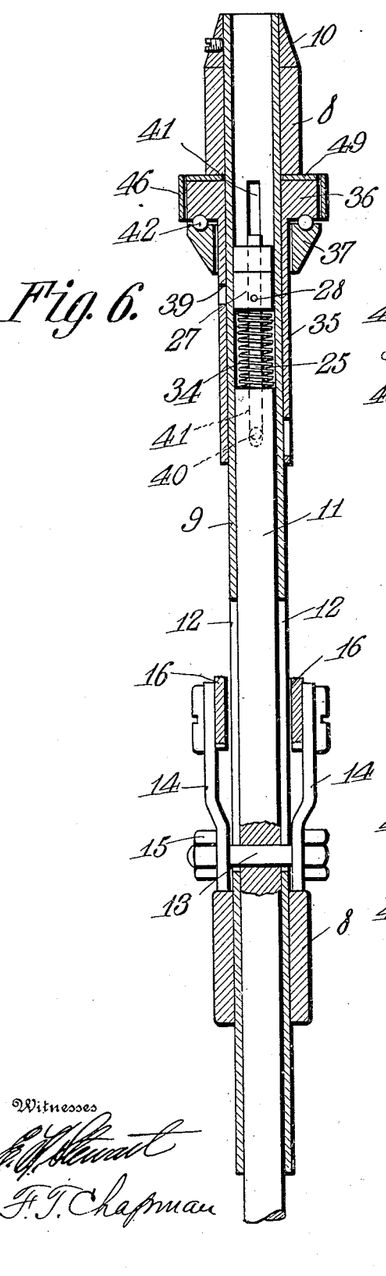
Fig. 6 is a longitudinal section with parts in elevation of the anvil carrier and guide.

The machine is, as before stated, adapted for buttons of different construction than the one shown to Figs. 7, 8, 9 and 10 and one button of a different form is shown in Fig. 14, this being a familiar type of button using a two-prong rivet. For such a button the passages 67 in the delivery end of the magazine must be differently shaped than shown in Fig. 3 and such different shape is indicated at 67 in Fig. 15.

Another type of button is indicated in Fig. 16 where the shank or stem of the button is formed with a circumferential series of serrations 33′ adapted to be forced outwardly over the cloth and confine the button thereto.

In Fig. 17 there is shown another form of button of my own invention, to which the machine is adapted. The shank of the button, designated at 95' in the drawing, is provided with an annular series of teeth or projections 96' and this shank is encircled by a collar 97 which may have a groove 98 at one end. An upsetting or clenching punch 5' is provided and this punch is shaped to cause the teeth 96' to be bent, outward and toward the body of the button, passing through the cloth, while the points of the teeth ultimately enter the groove 98.

In Fig. 18 there is shown an anvil 30' shaped to receive a washer and it will, of course, be understood that eyelets or gromets will require anvils of appropriate shape.

The several types of buttons and other fastening devices referred to may be taken as indicative of any of the known types thereof or of any special types thus indicating the wide range of use of the machine forming the subject matter of the present invention, the machine being also adapted for riveting or clenching or upsetting various fastening devices as will be readily apparent from the foregoing description.

While the machine has been designated as a button setting machine for the attachment of buttons to garments and the like it is evident that the machine without material change is adapted for the attachment of a two-part member to any fabric or material or to the joining of two members by a two-part rivet or eyelet, or the setting of eyelets or gromets.

The present invention relates to the means for presenting the rivet receiving member automatically into position on a suitable anvil for the reception of the rivet and the heading of the same against the anvil carrying the said rivet receiving member.

When fastening devices not requiring a rivet or clench member are used, appropriate changes may be made in the structure to conform the machine to such conditions.

What is claimed is:—

1. In a machine of the class described, a reciprocatory anvil for receiving one member of a fastening device, and a rotatable carrier concentric with the longitudinal axis of the anvil and provided with a pocket for receiving that member of the fastening device to be delivered to the anvil when the pocket is in one position and for delivering the said member to the anvil when the pocket is in another position.

2. In a machine of the class described, an anvil for receiving one member of a fastening device, and a carrier for delivering said fastening device members one at a time to the anvil, said carrier being movable about the longitudinal axis of the anvil from the point of reception of the fastening device member to the point of delivery of the same to the anvil.

3. In a machine of the class described, an anvil for receiving one member of a fastening device, and a rotatable carrier for receiving the chosen members of the fastening devices one at a time and delivering them also one at a time to the anvil at a point axially displaced with reference to the point of reception thereof.

4. In a machine of the character described, a reciprocatory rod carrying an anvil at one end, a tube surrounding and guiding said rod, means for reciprocating said rod, a rotatable sleeve surrounding the tube, connections between the rod and sleeve for causing rotative movement of the latter, and a pocketed member carried by the sleeve and adapted to receive rivet members one at a time and convey them from the point of reception to another point of entrance into the tube for deposition on the anvil.

5. In a machine of the character described, a reciprocatory rod, an anvil carried thereby, means for reciprocating said rod, a tubular member guiding said rod, a rotatable sleeve exterior to the tube and provided with a head having a pocket on one side, connections between the rod and sleeve for causing rotative movement of the latter by the reciprocatory movement of the rod, and a guide for rivet members adapted to discharge the rivet members one at a time into the pocket in the head carried by the sleeve.

6. In a machine of the character described, a reciprocatory rod carrying an anvil at one end and having a normally retracted position, a tubular member through which the rod is movable and constituting a guide for the rod, means for causing the reciprocation of said rod at the will of an operator, a reservoir for rivet members, a guide member connected to the reservoir for directing the rivet members to a point of discharge, a rotatable sleeve carried by the tube and receiving motion from the anvil carrying rod, said sleeve having a receiving pocket movable into coincidence with the rivet member guide and from thence to a position to discharge the rivet member onto the anvil when the latter is in the retracted position.

7. In a machine of the character described, a reciprocatory anvil carrying rod, a tubular member surrounding the same and serving as a guide for the rod, said tubular member having a passage through the wall thereof at a point above the anvil on the rod when the rod is in the retracted position, a sleeve surrounding the tube and capable of rotative movement thereon, said sleeve having a head at a point coincident with the passage through the tube and in turn provided with a receptacle for a rivet member, connections between the rod and the sleeve for imparting rotative movement to the sleeve in timed relation to the longitudinal movement of the rod, and means for reciprocating the rod at the will of an operator.

8. In a machine of the character described, an anvil carrier comprising a reciprocatory rod having one end reduced in diameter, and there slotted, a spring surrounding the reduced end of the rod, a sleeve receiving the slotted end of the rod and connected thereto by a pin traversing the slot, an anvil removably connected with the sleeve, and a tubular member in which the rod with the anvil and its elastic support are reciprocable.

In testimony that I claim the foregoing as my own, I have hereto affixed my signature in the presence of two witnesses.

CHARLES ROMM.

Witnesses:
E. HUMIE TALBERT,
E. C. SCHLADT.